United States Patent
Jaini et al.

(10) Patent No.: US 10,198,443 B2
(45) Date of Patent: *Feb. 5, 2019

(54) SYSTEM AND METHOD FOR SUGGESTING MEDIA CONTENT CONTRIBUTIONS FOR A COLLABORATIVE PLAYLIST

(71) Applicant: Google LLC, Mountain View, CA (US)

(72) Inventors: Shiva Jaini, Sunnyvale, CA (US); Weijian Cheng, San Bruno, CA (US); Vidya Rangasayee Narayan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,175

(22) Filed: Dec. 19, 2017

(65) Prior Publication Data

US 2018/0107670 A1   Apr. 19, 2018

Related U.S. Application Data

(63) Continuation of application No. 14/987,480, filed on Jan. 4, 2016, now Pat. No. 9,864,748, which is a
(Continued)

(51) Int. Cl.
*G06F 17/30* (2006.01)
*H04N 21/262* (2011.01)
(Continued)

(52) U.S. Cl.
CPC .... *G06F 17/30056* (2013.01); *G06F 3/04842* (2013.01); *G06F 17/30017* (2013.01);
(Continued)

(58) Field of Classification Search
CPC .. G06F 17/241; G06F 17/30; G06F 17/30038; G06F 17/30041;
(Continued)

(56) References Cited

U.S. PATENT DOCUMENTS

| | | |
|---|---|---|
| 7,945,862 B2 | 5/2011 | Aldrich et al. |
| 8,055,720 B2 | 11/2011 | He et al. |

(Continued)

OTHER PUBLICATIONS

Notice of Allowance dated Aug. 31, 2015 in U.S. Appl. No. 13/600,296.
(Continued)

*Primary Examiner* — Le H Luu
(74) *Attorney, Agent, or Firm* — Byrne Poh LLP

(57) ABSTRACT

Systems and techniques for suggesting media content contributions for a collaborative playlist are presented. The system can include a playlist component, a social component, and a suggestion component. The playlist component generates a playlist of media content in response to a request from a playlist owner. The social component invites at least one invitee to join a playlist collaboration group comprising the playlist owner and the at least one invitee. The suggestion component displays uploaded media content of the at least one invitee to allow the at least one invitee to add the uploaded media content to the playlist of the media content. The uploaded media content is determined based on a comparison of metadata of the uploaded media content with other metadata of the media content associated with the playlist.

21 Claims, 12 Drawing Sheets

Related U.S. Application Data continuation of application No. 13/600,296, filed on Aug. 31, 2012, now Pat. No. 9,229,938.

(51) Int. Cl.
  *H04N 21/482*   (2011.01)
  *G06F 3/0484*   (2013.01)
  *H04L 29/08*   (2006.01)

(52) U.S. Cl.
  CPC .. *G06F 17/30038* (2013.01); *G06F 17/30053* (2013.01); *G06F 17/3074* (2013.01); *G06F 17/30244* (2013.01); *G06F 17/30772* (2013.01); *G06F 17/30781* (2013.01); *G06F 17/30867* (2013.01); *H04L 67/22* (2013.01); *H04L 67/306* (2013.01); *H04N 21/26258* (2013.01); *H04N 21/4825* (2013.01)

(58) Field of Classification Search
  CPC ......... G06F 17/30265; G06F 17/30017; G06F 17/30244; G06F 17/30781; G06F 17/3074; G06F 17/30053; G06F 17/30772; G06Q 10/103; G06Q 10/10; G06T 17/005; G10H 1/366; H04N 7/17318; H04N 21/26258; H04N 21/4825
  See application file for complete search history.

(56) References Cited

U.S. PATENT DOCUMENTS

| | | | |
|---|---|---|---|
| 8,078,677 B2 | 12/2011 | Mendiola | |
| 2010/0098153 A1* | 4/2010 | McCarthy | H04N 7/17318 375/240.02 |
| 2011/0126086 A1* | 5/2011 | Bedingfield, Sr. | G06F 17/30041 715/202 |
| 2011/0251842 A1* | 10/2011 | Cook | G10H 1/366 704/207 |
| 2011/0292231 A1* | 12/2011 | Winters | H04N 1/00137 348/222.1 |
| 2012/0041907 A1 | 2/2012 | Wang et al. | |
| 2012/0150960 A1 | 6/2012 | Nalawade | |
| 2013/0097172 A1* | 4/2013 | McIntosh | G06F 17/3002 707/741 |
| 2013/0124546 A1* | 5/2013 | Wormley | H04L 63/101 707/758 |
| 2013/0144566 A1* | 6/2013 | De Biswas | G06T 17/005 703/1 |
| 2013/0179799 A1* | 7/2013 | Savage | G06F 3/0482 715/751 |
| 2013/0191454 A1* | 7/2013 | Oliver | G06F 17/30772 709/204 |
| 2013/0198600 A1* | 8/2013 | Lockhart | G06F 17/241 715/230 |
| 2013/0254308 A1* | 9/2013 | Rose | H04N 21/252 709/206 |
| 2014/0074629 A1* | 3/2014 | Rathod | G06Q 10/10 705/14.73 |

OTHER PUBLICATIONS

Notice of Allowance dated Aug. 31, 2017 in U.S. Appl. No. 14/987,480.
Office Action dated Apr. 10, 2015 in U.S. Appl. No. 13/600,296.
Office Action dated Jun. 15, 2017 in U.S. Appl. No. 14/987,480.
Office Action dated Sep. 24, 2014 in U.S. Appl. No. 13/600,296.
Office Action dated Dec. 16, 2016 in U.S. Appl. No. 14/987,480.

\* cited by examiner

SYSTEM AND METHOD FOR SUGGESTING MEDIA CONTENT CONTRIBUTIONS FOR A COLLABORATIVE PLAYLIST

CROSS-REFERENCE TO RELATED APPLICATIONS

This application is a continuation of U.S. patent application Ser. No. 14/987,480, filed Jan. 4, 2016, which is a continuation of U.S. patent application Ser. No. 13/600,296, filed Aug. 31, 2012, which are hereby incorporated by reference herein in their entireties.

TECHNICAL FIELD

This disclosure relates generally to collaborative playlists, and more specifically, to suggesting media content to contribute to a collaborative playlist.

BACKGROUND

Many conventional service providers allow users to upload media content (e.g., audio and/or video content) to a server (e.g., a media content server). The media content can then be delivered (e.g., streamed) to other users. However, conventional service providers do not provide adequate organization and/or sharing of related media content (e.g., related media content uploaded to the media content server) amongst users.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a playlist component, a social component and a suggestion component. The playlist component generates a playlist of media content in response to a request from a playlist owner. The social component invites at least one invitee to join a playlist collaboration group comprising the playlist owner and the at least one invitee. The suggestion component displays uploaded media content of the at least one invitee to allow the at least one invitee to add the uploaded media content to the playlist of the media content. The uploaded media content is determined based on a comparison of metadata of the uploaded media content with other metadata of the media content associated with the playlist.

In accordance with another implementation, a system includes a queuing component, a network component and a presentation component. The queuing component receives a playlist of media content hosted by at least one content site or service. The playlist is collaboratively created by a playlist group whose members are (1) accountholders of at least one social networking site or service associated with a playlist owner, and (2) at least one invitee selected by the playlist owner. The network component interfaces with the at least one content site or service. The presentation component presents uploaded media content of the at least one invitee to allow the at least one invitee to add the uploaded media content to the playlist of media content based at least in part on metadata of the uploaded media content. The uploaded media content is received from the at least one content site or service.

In accordance with yet another implementation, a system includes an identification component and a notification component. The identification component identifies uploaded content associated with two or more users. The notification component notifies the two or more users of the uploaded content and invites the two or more users to collaborate to share the uploaded content.

Additionally, a non-limiting implementation provides for generating a playlist of media content in response to a request from a playlist owner, inviting at least one invitee to join a playlist collaboration group comprising the playlist owner and the at least one invitee, and displaying uploaded media content of the at least one invitee to allow the at least one invitee to add the uploaded media content to the playlist of the media content. The uploaded media content is determined based on metadata of the uploaded media content.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
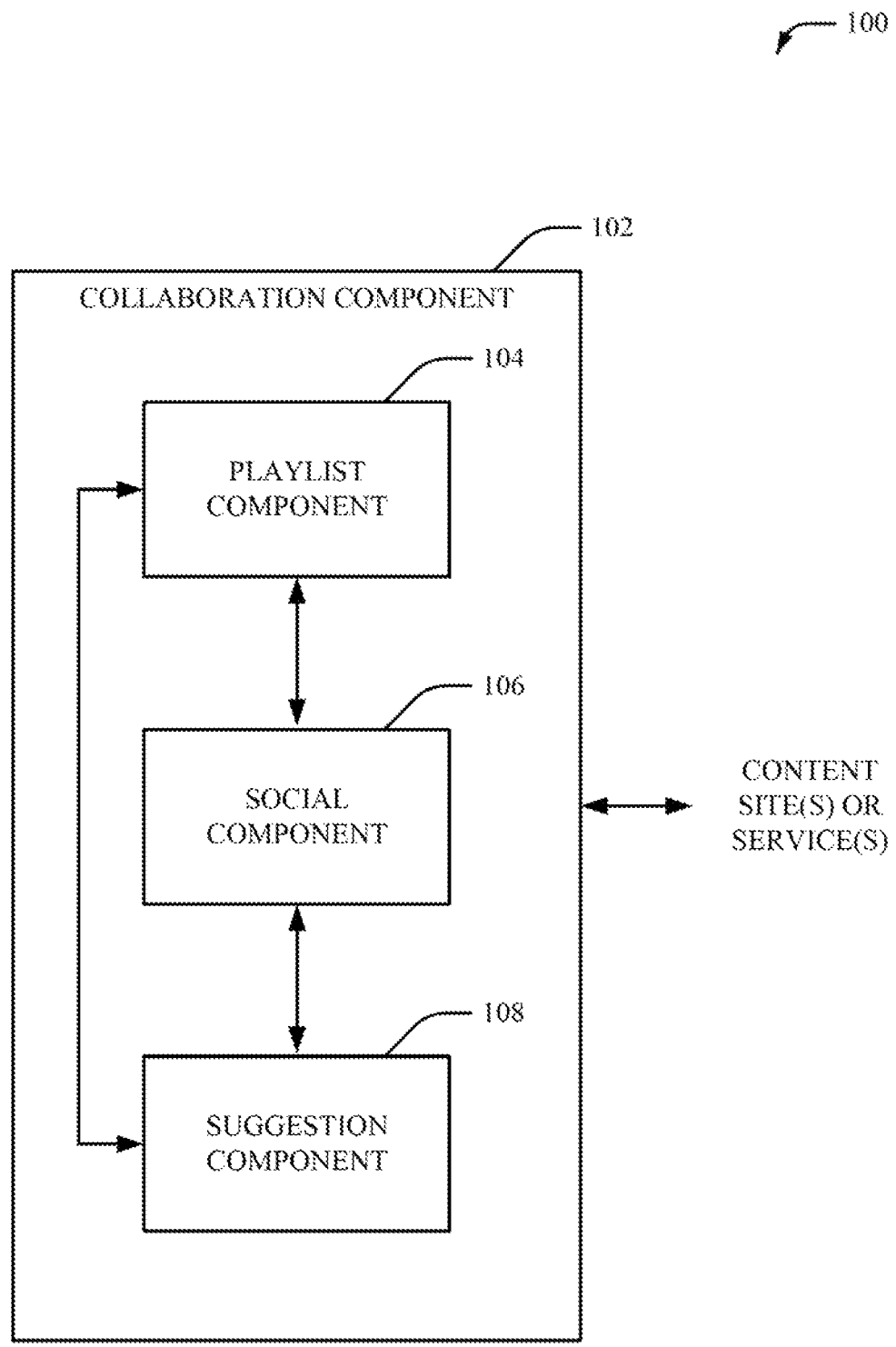
FIG. 1 illustrates a high-level diagram of an example collaboration component, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Many conventional service providers allow users to upload media content (e.g., audio and/or video content) to a server (e.g., a media content server). The media content can then be delivered (e.g., streamed) to other users. However, conventional service providers do not provide adequate organization and/or sharing of related media content (e.g., related media content uploaded to the media content server) amongst users. For example, conventional methods of sharing media content with other users require a user to actively organize media content and/or share media content with other users. One solution is to allow media content to be added to a playlist. For example, one or more users can contribute media content to the playlist. Therefore, a playlist can include a plurality of related media content from a plurality of users. However, users are still required to be actively engaged and/or to actively contribute to the playlist creation process. As such, this can result in less participation from end-users that are not active contributors.

To that end, techniques for suggesting media content contributions for a collaborative playlist are presented. A collaborative playlist is a playlist that allows multiple users (e.g., individuals) to contribute to the playlist creation process by adding, editing and/or modifying media content in the playlist. A user (e.g., a playlist owner) can create a collaborative playlist. Furthermore, the user (e.g., the playlist owner) can select (e.g., invite) one or more group contributors (e.g., one or more invitees) to collaborate in creating and/or maintaining the collaborative playlist. The user (e.g., the playlist owner) can set privacy settings for the collaborative playlist as well as permissions for the one or more group contributors (e.g., the one or more invitees). Each of the group contributors (e.g., the one or more invitees) can receive a notification (e.g., an invitation) to contribute to the collaborative playlist.

Additionally, media content contributions for the collaborative playlist can be suggested to the one or more group contributors based on metadata of uploaded media content of the one or more group contributors. For example, when a particular group contributor interacts with media content from the collaborative playlist (e.g., watches a video from the collaborative playlist), metadata of uploaded media content (e.g., uploaded videos) of the particular group contributor can be compared with metadata of media content (e.g., videos) from the collaborative playlist. In response to a determination that uploaded media content of the particular group contributor is relevant (e.g., related) to media content from the collaborative playlist, the relevant uploaded media content of the particular group contributor can be presented to the particular group contributor. For example, the relevant uploaded media content of the particular group contributor can be displayed in the context of a watch page associated with the media content of the collaborative playlist so that the particular group contributor can add the relevant uploaded media content to the collaborative playlist (e.g., with a single click of a button). Therefore, media content (e.g., media content that can be added to the collaborative playlist) can be contextually suggested based on relevancy to the content in the collaborative playlist.

Referring initially to FIG. 1, there is illustrated an example system 100 that suggests media content contributions for a collaborative playlist, according to an aspect of the subject disclosure. In one example, the system 100 can be implemented on or in connection with a server that hosts user-uploaded media content. For example, the system 100 can be implemented on or in connection with one or more content sites or services. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

Specifically, the system 100 can provide a collaboration component with a playlist feature (e.g., playlist component 104), a social feature (e.g., social component 106) and a suggestion feature (e.g., suggestion component 108) that can be utilized in most any media content application. The playlist feature can generate a playlist of media content in response to a request from a playlist owner. The social feature can invite at least one invitee to join a playlist collaboration group comprising the playlist owner and the at least one invitee. The suggestion feature can display uploaded media content of the at least one invitee to allow the at least one invitee to add the uploaded media content to the playlist of media content. The uploaded media content can be determined based on a comparison of metadata of the uploaded media content with other metadata of the media content associated with the playlist. The system 100 can be employed by various systems, such as, but not limited to media server systems, media content server systems, network systems, computer network systems, communication systems, router systems, server systems, high availability server systems (e.g., Telecom server systems), Web server systems, file server systems, disk array systems, powered insertion board systems, cloud-based systems, and the like.

In particular, the system 100 can include a collaboration component 102. In FIG. 1, the collaboration component 102 includes a playlist component 104, a social component 106 and a suggestion component 108. The collaboration component 102 can be implemented on or in connection with one or more content sites or services. The playlist component 104 can generate a playlist of media content in response to a request from a playlist owner. For example, a user desiring to create a playlist can initially transmit a request to the playlist component 104. Upon receipt of the request, the playlist component 104 can construct the playlist, designating the user as the playlist owner. The playlist can represent a listing of and/or references to various media content that can be accessed from one or more content sites or services. The media content can include one or more videos uploaded to a content site or service. However, it is to be appreciated that other media file formats can exist as well such as other audio/visual formats, audio formats, or visual formats. In some implementations the media content can be publicly accessible and/or accessed free of charge or obligation. In other implementations the media content can be limited, for example, based upon authorization or licensing constraints.

The social component 106 can invite at least one invitee (e.g., via an invitation) to join a playlist collaboration group comprising the playlist owner and the at least one invitee. The social component 106 can generate one or more notifications to invite the at least one invitee to join the playlist collaboration group. The social component 106 can be interfaced to one or more social networking sites in order to facilitate an invitation. The playlist collaboration group can be comprised of the playlist owner (e.g., the user that requested creation of the playlist) and at least one invitee (e.g., a user that, along with the playlist owner, can be authorized to collaborate in the evolution of the playlist). In one example, at least one invitee can be selected by the playlist owner. Moreover, in some implementations, the playlist owner is not included in the playlist collaboration group (e.g., the playlist owner is not designated as a member).

The suggestion component 108 can display uploaded media content of the at least one invitee to allow the at least one invitee to add the uploaded media content to the playlist of media content. The uploaded media content can be previously uploaded media content, currently uploaded media content or media content uploaded in the future. For example, the uploaded media content can be uploaded (e.g., to a media content server) before media content of the playlist, at the same time as media content of the playlist, or after media content of the playlist.

The uploaded media content can be determined based on a comparison of metadata of the uploaded media content with other metadata of the media content associated with the playlist. The comparison of the metadata of the uploaded media content with the other metadata of the media content associated with the playlist can be used to determine whether the uploaded media content is related to the media content associated with the playlist. The metadata can include, but is not limited to, a title (e.g., a video title), a keyword(s), a description, a tag, a location, a timestamp (e.g., a video timestamp), information about individuals (e.g., users, invitees, etc.) associated with the media content or the uploaded media content, other information related to the media content or the uploaded media content, etc. The uploaded media content can include one or more uploaded videos uploaded by the at least one invitee to the content site or service. In one example, the uploaded media content can be included in an existing playlist of other media content of the at least one invitee. In another example, the uploaded media content can be a subset of the other media content of the existing playlist that is determined to be relevant to the playlist.

The suggestion component 108 can display the uploaded media content of the at least one invitee to the at least one invitee via a thumbnail when the media content associated with the playlist is viewed by the at least one invitee. For example, the uploaded media content of the at least one invitee can be displayed when the at least one invitee is watching a video from the playlist. The thumbnail can be displayed along with information related to the media content associated with the playlist. The suggestion component 108 can generate a notification that includes the uploaded media content of the at least one invitee. For example, the suggestion component 108 can generate the notification in a watch page (e.g., a watch page associated with the media content from the playlist). As such, the uploaded media content of the at least one invitee can be contextually suggested to the at least one invitee. In one embodiment, the social component 106 can notify users of the types of information that are stored in respective applications logs and/or transmitted to the content sites or services (e.g., one or more servers), and can provide the user the opportunity to opt-out of having such information collected and/or shared with the content sites or services (e.g., one or more servers).

It is to be appreciated that the collaboration component 102 can suggest different types of content other than media content. For example, the playlist component 104 can generate a collection of content (e.g., documents). The suggestion component 108 can recommend content (e.g., documents) to add to the collection based on metadata of the documents and/or contributors to the collection of content.

While FIG. 1 depicts separate components in system 100, it is to be appreciated that the components may be implemented in a common component. In one example, the playlist component 104, the social component 106 and/or the suggestion component 108 can be included in a single component. Further, it can be appreciated that the design of system 100 can include other component selections, component placements, etc., to suggest media content contributions for a collaborative playlist.

Figure 2:
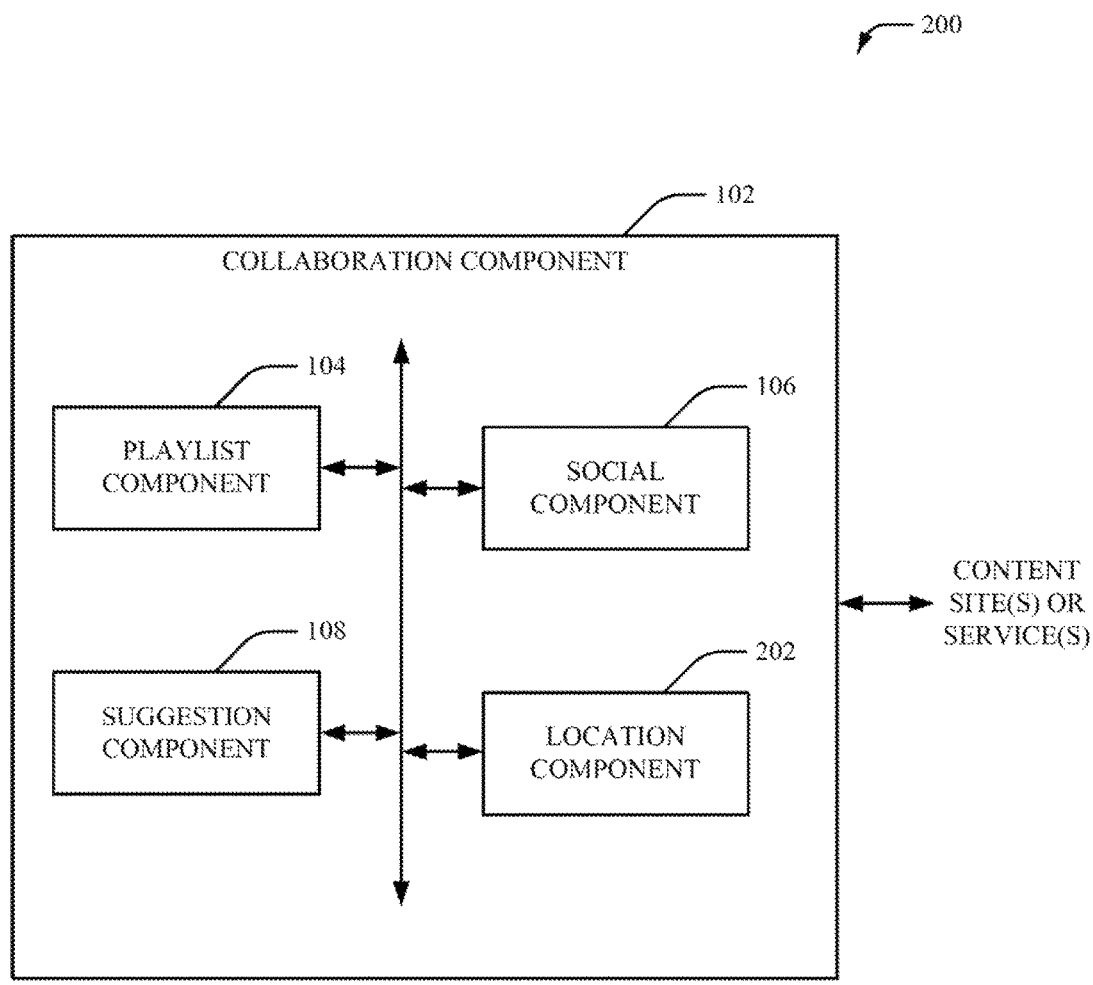
FIG. 2 illustrates a high-level diagram of an example collaboration component with a location feature, in accordance with various aspects and implementations described herein.

Referring now to FIG. 2, there is illustrated a non-limiting implementation of a system 200 in accordance with various aspects and implementations of this disclosure. The system 200 includes the playlist component 104, the social component 106, the suggestion component 108 and a location component 202. The location component 202 can determine a geographic location associated with the media content and/or the uploaded media content. For example, the location component 202 can identify media content from one or more users at a particular geographic location and/or at a particular time (e.g., based on one or more timestamps associated with the media content). In one example, media content from one or more users at an event (e.g., a party, a public event, a sporting event, etc.) can be identified. The metadata of the uploaded media content can include the geographic location associated with the uploaded media content. As such, the uploaded media content of the at least one invitee can be contextually suggested to the at least one invitee based on a location (e.g., a geographic location) associated with the uploaded media content.

In one example, a first user can create a playlist associated with an event on a media content server. The playlist can include videos taken by other users who were present at the event. The first user can share a playlist associated with this event and/or invite the other users (e.g., via an invitation) to contribute to the playlist. As such, a second user (e.g., a particular user from the other users) can receive the invitation from the first user. Furthermore, when the second user goes to a website associated with the media content server to watch video(s) already uploaded to the playlist, the location component 202 can determine that the second user has uploaded one or more videos related to the event to the media content server (e.g., via a mobile device and/or a mobile application). For example, the location component 202 can associate one or more videos uploaded by the second user based on a common geographic location and/or timestamp between the one or more videos uploaded by the second user and the video(s) already uploaded to the playlist. The suggestion component 108 can display the one or more videos uploaded by the second user (e.g., relevant videos) to the second user as the second user is watching the video(s) already included in the playlist. For example, a thumbnail of the one or more videos uploaded by the second user can be presented to the second user while the second user is viewing a video from the playlist. As such, the second user can add the one or more videos uploaded by the second user to the playlist (e.g., by pushing a button associated with the thumbnail of the one or more videos). Therefore, the location component 202 can associate multiple videos (e.g., from multiple users) based on location information (e.g., location metadata).

While FIG. 2 depicts separate components in system 200, it is to be appreciated that the components may be implemented in a common component. In one example, the playlist component 104, the social component 106, the suggestion component 108 and/or the location component 202 can be included in a single component. Further, it can be appreciated that the design of system 200 can include other component selections, component placements, etc., to suggest media content contributions for a collaborative playlist (e.g., based on a location associated with the media content).

Figure 3:
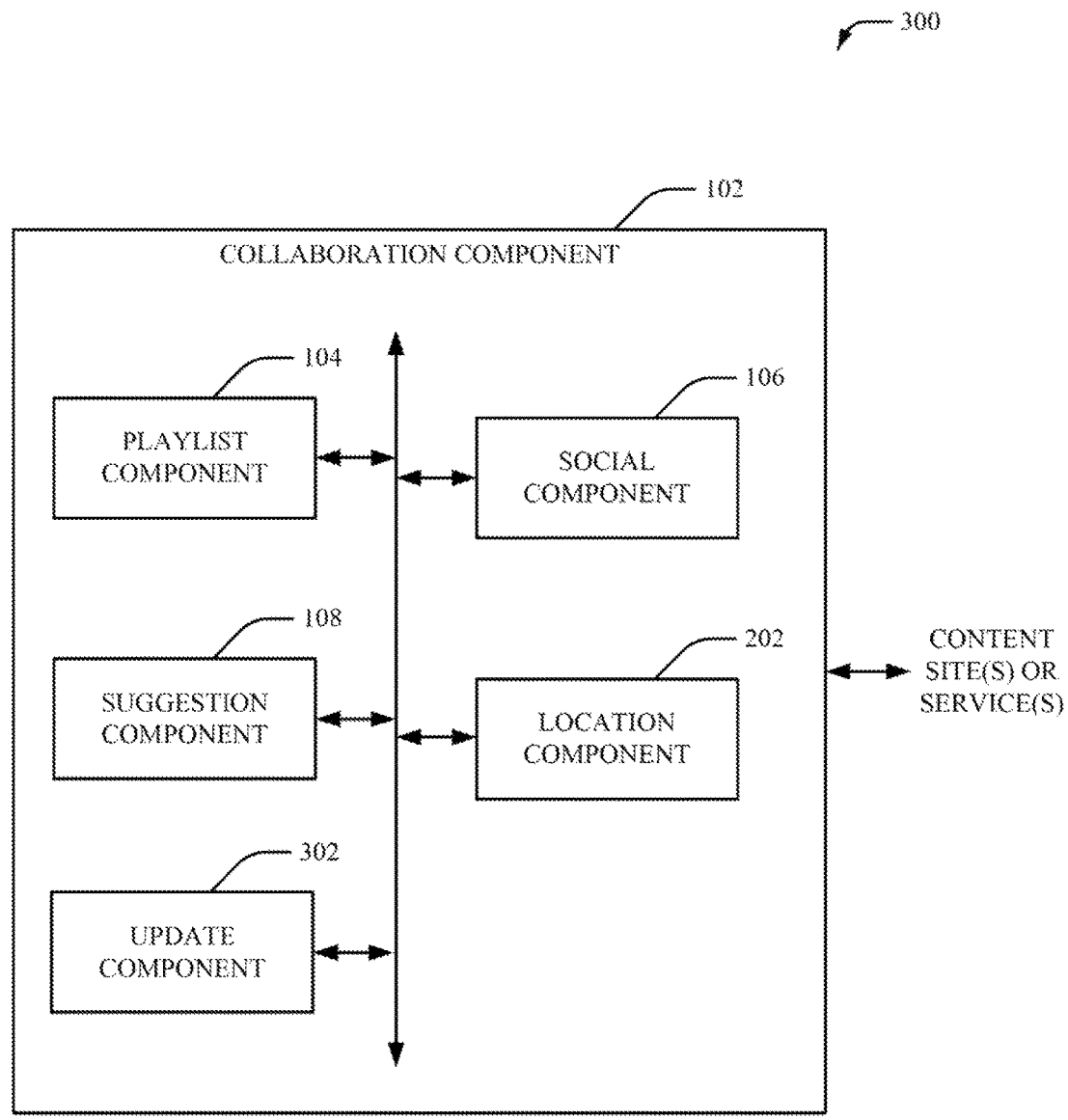
FIG. 3 illustrates a high-level diagram of an example collaboration component with an update feature, in accordance with various aspects and implementations described herein.

Referring now to FIG. 3, there is illustrated a non-limiting implementation of a system 300 in accordance with various aspects and implementations of this disclosure. The system 300 includes the playlist component 104, the social component 106, the suggestion component 108, the location component 202 and an update component 302. The update component 302 can add the uploaded media content to the playlist in response to an action (e.g., pushing of a button on a user interface) by the at least one invitee to add the uploaded media to the playlist. The update component 302 can be configured to execute an update to the playlist in response to input. For example, input can be received from the playlist owner or the at least one invitee. In response to the input, the update component 302 can apply an update to the playlist (e.g., add one or more videos to the playlist). In one example, the update component 302 can be further configured to include an identification of a user (e.g., a user ID) associated with the uploaded media content in the playlist. For example, a user ID can be added (e.g., as metadata) to the media content and/or the uploaded media content. As such, relevant playlist authors and/or identifications can be maintained. Hence, during playback of the playlist, a given media content item can be annotated with a name or other identification data of the member of the playlist collaboration group who included that media content item in the playlist.

While FIG. 3 depicts separate components in system 300, it is to be appreciated that the components may be implemented in a common component. In one example, the playlist component 104, the social component 106, the suggestion component 108, the location component 202 and/or the update component 302 can be included in a single component. Further, it can be appreciated that the design of system 300 can include other component selections, component placements, etc., to update media content in a collaborative playlist.

Figure 4:
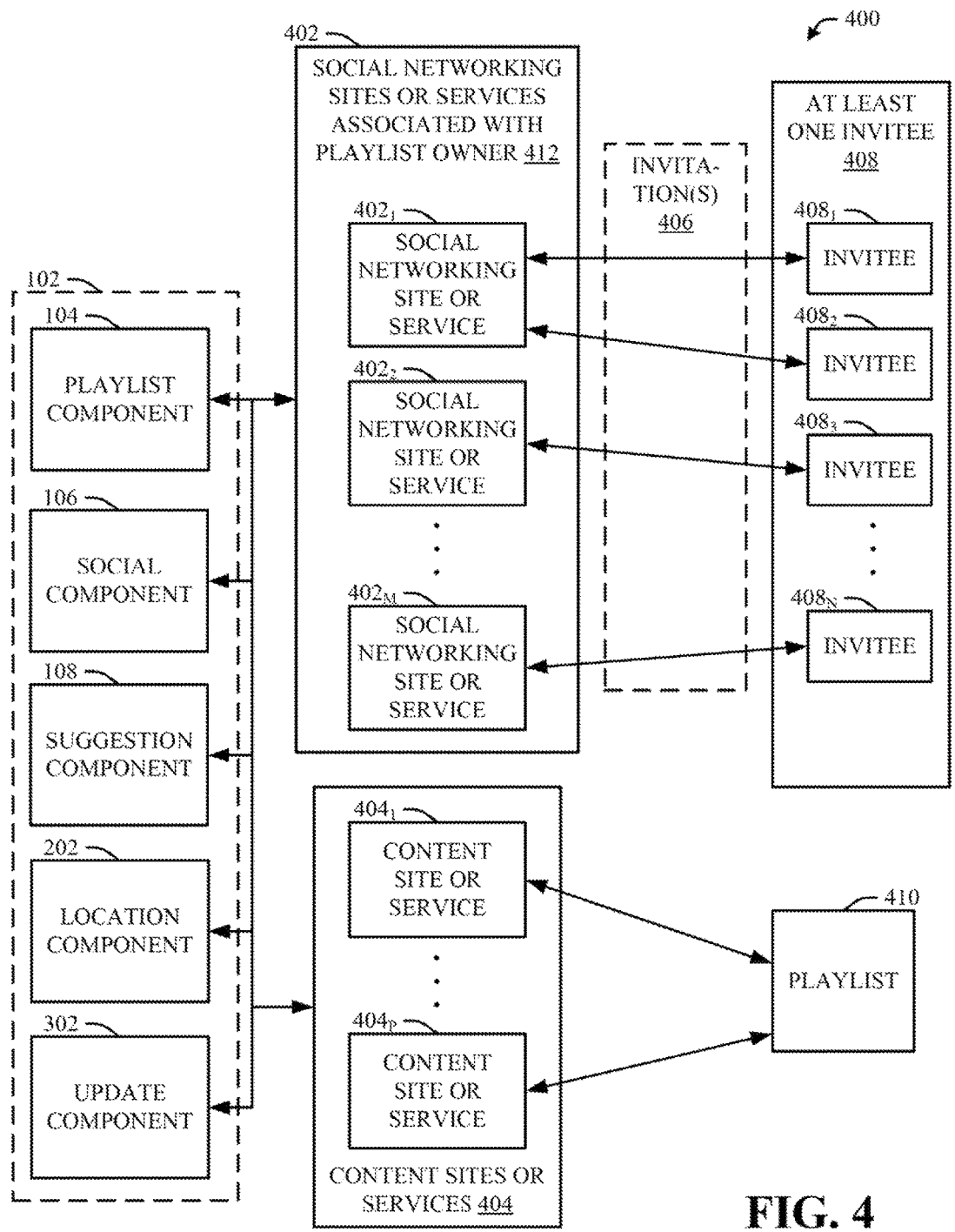
FIG. 4 illustrates an example diagram of a non-limiting example system that illustrates a collaboration component in connection with multiple social networking sites or service and/or multiple content sites or services, in accordance with various aspects and implementations described herein.

Turning now to FIG. 4, there is illustrated a non-limiting implementation of a system 400 in accordance with various aspects and implementations of this disclosure. System 400 illustrates playlist collaboration in connection with multiple social networking sites or service and/or multiple content sites or services. System 400 can include the playlist component 104, the social component 106, and the suggestion component 108 (e.g., the collaboration component 102). Additionally, the system 400 can include the location component 202 and/or the update component 302. The social component 106 (and/or other components detailed herein) can be configured to interface to multiple social networking sites or services 402, with individual social networking sites or services denoted by reference numerals $402_1$-$402_M$. Each of the multiple social networking sites or services 402 includes a set of users (e.g., accountholders), which will generally include a playlist owner 412 and one or more invitee $408_1$-$408_N$ of the at least one invitee 408.

The social component 106 can facilitate invitations 406 and/or other communication features via the social networking sites or services 402 and/or the content sites or services 404. Responses to invitation 406, as well as other input and/or update(s), can be propagated to or from the at least one invitee 408 via the appropriate social networking sites or services 402 and/or the content sites or services 404, or by way of direct communication with the social component 106.

The suggestion component 108 can display uploaded media content of the at least one invitee (e.g., the invitee $408_1$, etc.) to allow the at least one invitee (e.g., the invitee $408_1$, etc.) to add the uploaded media content to the playlist 410. The uploaded media content can be determined based on a comparison of metadata of the uploaded media content of the at least one invitee with other metadata of media content associated with the playlist 410. The comparison of the metadata of the uploaded media content of the at least one invitee with the other metadata of the media content associated with the playlist 410 can be used to determine whether the uploaded media content of the at least one invitee is related to the media content associated with the playlist 410. The metadata can include, but is not limited to, a title (e.g., a video title), a keyword(s), a description, a tag, a location, a timestamp (e.g., a video timestamp), information about invitees (e.g., invitee $408_1$-$408_M$) associated with the media content or the uploaded media content, other information related to the media content or the uploaded media content, etc.

In some implementations, media content that is referenced by playlist 410 can be distributed among multiple different network accessible content sites or service $404_1$-$404_P$. Therefore, it is understood that the playlist component 104 (or other components detailed herein) can be interfaced to multiple different content sites or services 402, employed for instance when construction or updating playlist 410 (e.g., providing location/manifest information to playlist 410). It is further understood that subscripts M, N, and P are intended to be substantially any positive integer or other value suitable for use with the disclosed subject matter.

Figure 5:
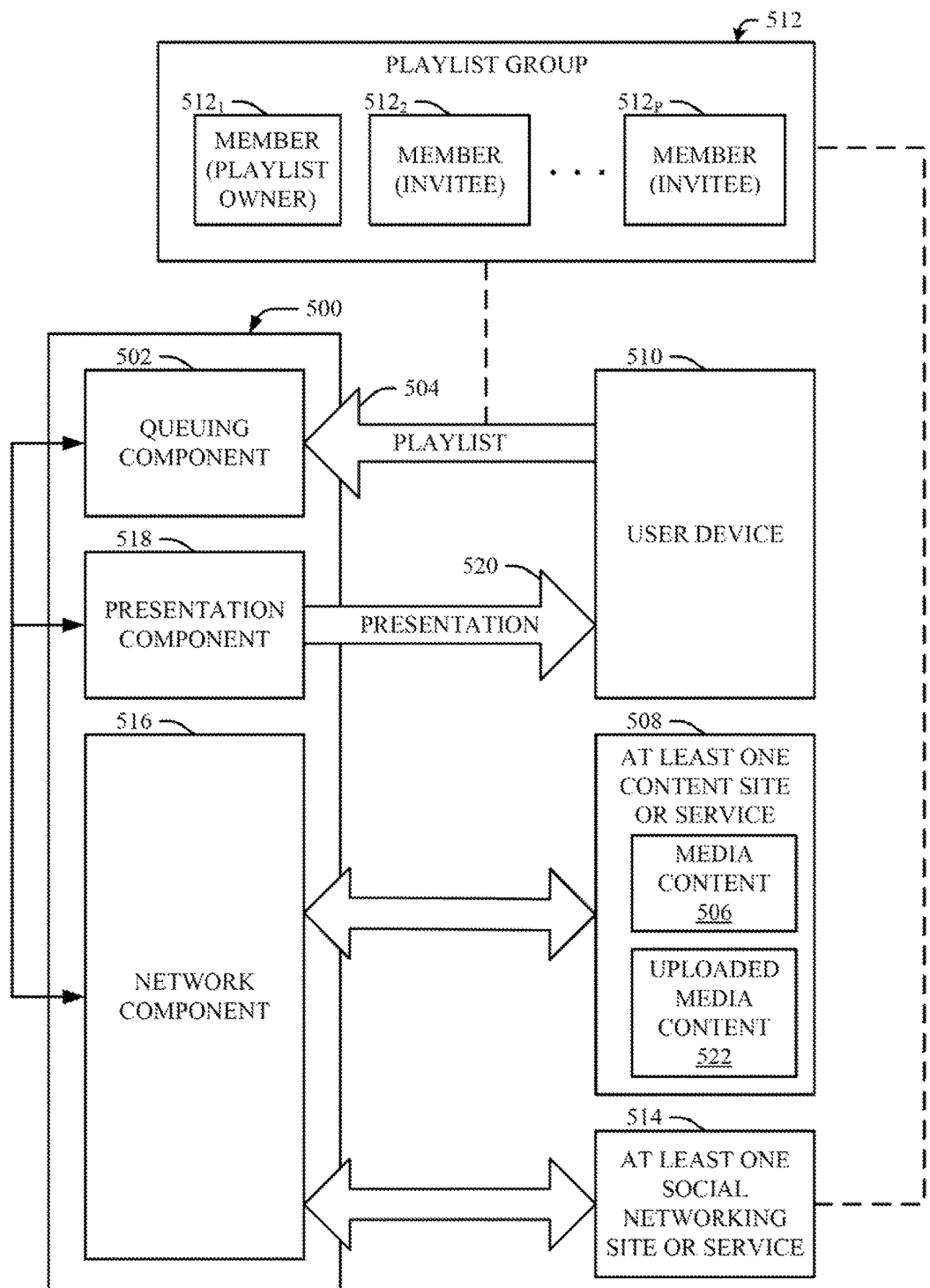
FIG. 5 illustrates a functional diagram of a non-limiting example of a collaborative playlist playback system, in accordance with various aspects and implementations described herein.

Referring now to FIG. 5, system 500 is depicted. The system 500 depicts an example of collaborative playlist playback. The system 500 can include a queuing component 502 that can be configured to receive a playlist 504 of publicly accessible media content 506 hosted by at least one content site or service 508. The playlist 504 received by the queuing component 502 can be received by way of a user device 510 and can be collaboratively created by a playlist group 512. Members of the playlist group 512 are depicted by reference numerals $512_1$-$512_P$ and will typically include a playlist owner (e.g., member $512_1$) who requested creation of the playlist 504 as well as one or more additional members (e.g., invitees $512_2$-$512_P$) who are selected by the playlist owner. In one or more implementations, members of the playlist group 512 are accountholders of at least one social networking site or service 514 associated with the playlist owner. That is, the playlist owner is an accountholder of the at least one social networking site or service 514 as are the other members of the playlist group 512 who are selected by the playlist owner (e.g., from a listing of contacts associated with at least one social networking site or service 514).

System 500 can also include a network component 516 that can be configured to interface with the at least one content site or service 508. In one or more implementation, the network component 516 can also interface to at least one social networking site or service 514. The network component 516 can operate as a proxy by which other components of the system 500 or components otherwise detailed herein can communicate. For example, the system 500 can include a presentation component 518, which can leverage the interfacing between the network component 516 and at the least one content site or service 508. Specifically, the presentation component 518 can be configured to present (e.g., via a presentation 520) the media content 506 that is featured in the playlist 504. The media content 506 can be received from the at least one content site or service 508. Additionally, the presentation component 518 can present uploaded media content 522 of at least one invitee (e.g., invitees $512_2$-$512_P$) to allow the at least one invitee (e.g., the invitees $512_2$-$512_P$) to add the uploaded media content 522 to the playlist 504 based at least in part on metadata of the uploaded media content 522, as more fully disclosed herein. The uploaded media content 522 can be received from the at least one content site or service 508. The presentation component 518 can present the uploaded media content 522 of the at least one invitee along with the media content 506 referenced by the playlist 504, for example, on the user device 510. For example, the presentation component 518 can present a thumbnail of the uploaded media content 522 (e.g., in a watch page) along with the media content 506 referenced by the playlist 504. As such, uploaded media content that can be added to the playlist 504 can be contextually suggested to the at least one invitee (e.g., invitees $512_2$-$512_P$).

It is appreciated that the at least one content site or service 508 can be a video hosting website to which the media content 506 and/or the uploaded media content 522 has been uploaded by a set of users. Moreover, the presentation 520 is intended to include presentation of either audio and/or video elements associated with the media content 506 and/or the uploaded media content 522. It is further appreciated that the user device 510 can be substantially any device capable of receiving, maintaining, and transmitting the playlist 504 and/or providing for the presentation 520. For example, user device can be a smart phone, a personal computer, a laptop, a tablet, a reader, etc. Furthermore, all or portions of the system 500 can be included in the user device 510.

Figure 6:
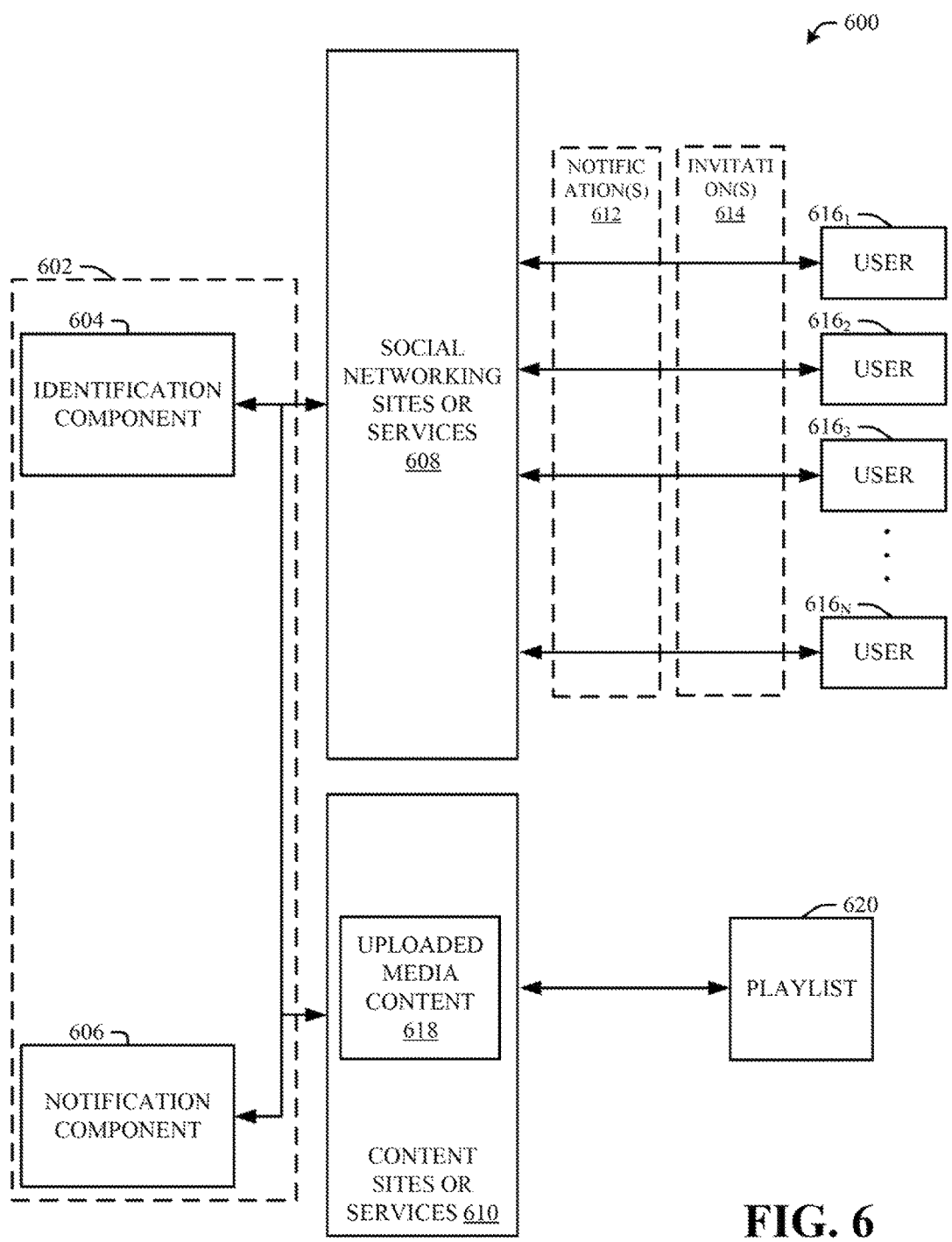
FIG. 6 illustrates an example diagram of a non-limiting example system that illustrates playlist collaboration in connection with multiple social networking sites or service and/or multiple content sites or services, in accordance with various aspects and implementations described herein.

Turning now to FIG. 6, there is illustrated a non-limiting implementation of a system 600 in accordance with various aspects and implementations of this disclosure. The system 600 can include a component 602. The component 602 can include an identification component 604 and a notification component 606. The system 600 can also include social networking sites or services 608, content sites or services 610, notification(s) 612, invitation(s) 614, users $616_1$-$616_N$ and a playlist 620. The content sites or services 610 can maintain uploaded media content 618. The users $616_1$-$616_N$ can be users of the social networking sites or services 608 and/or the content sites or services 610. The notification(s) 612 and/or the invitation(s) 614 can be presented to the users $616_1$-$616_N$ via the social networking sites or services 608 and/or the content sites or services 610.

The identification component 604 can identify uploaded content (e.g., uploaded media content 618) associated with two or more users (e.g., two or more of the users $616_1$-$616_N$). For example, the identification component 604 can determine that uploaded media content of two or more users is related (e.g., based on metadata of the uploaded media content, as more fully disclosed herein). The notification component 606 can notify the two or more users of the uploaded content (e.g., that the uploaded media content can be added to the playlist 620). For example, the notification(s) 612 can be sent to two or more of the users $616_1$-$616_N$. Additionally, the notification component 606 can invite (e.g., via the invitation(s) 614) the two or more users to collaborate to share the uploaded content (e.g., via the playlist 620). For example, a notification can include a thumbnail of uploaded content that can be added to the playlist 620 and/or a mechanism to add the uploaded content to the playlist 620. In one example, the invitation(s) 614 can be included in the notification(s) 612, or vice versa.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
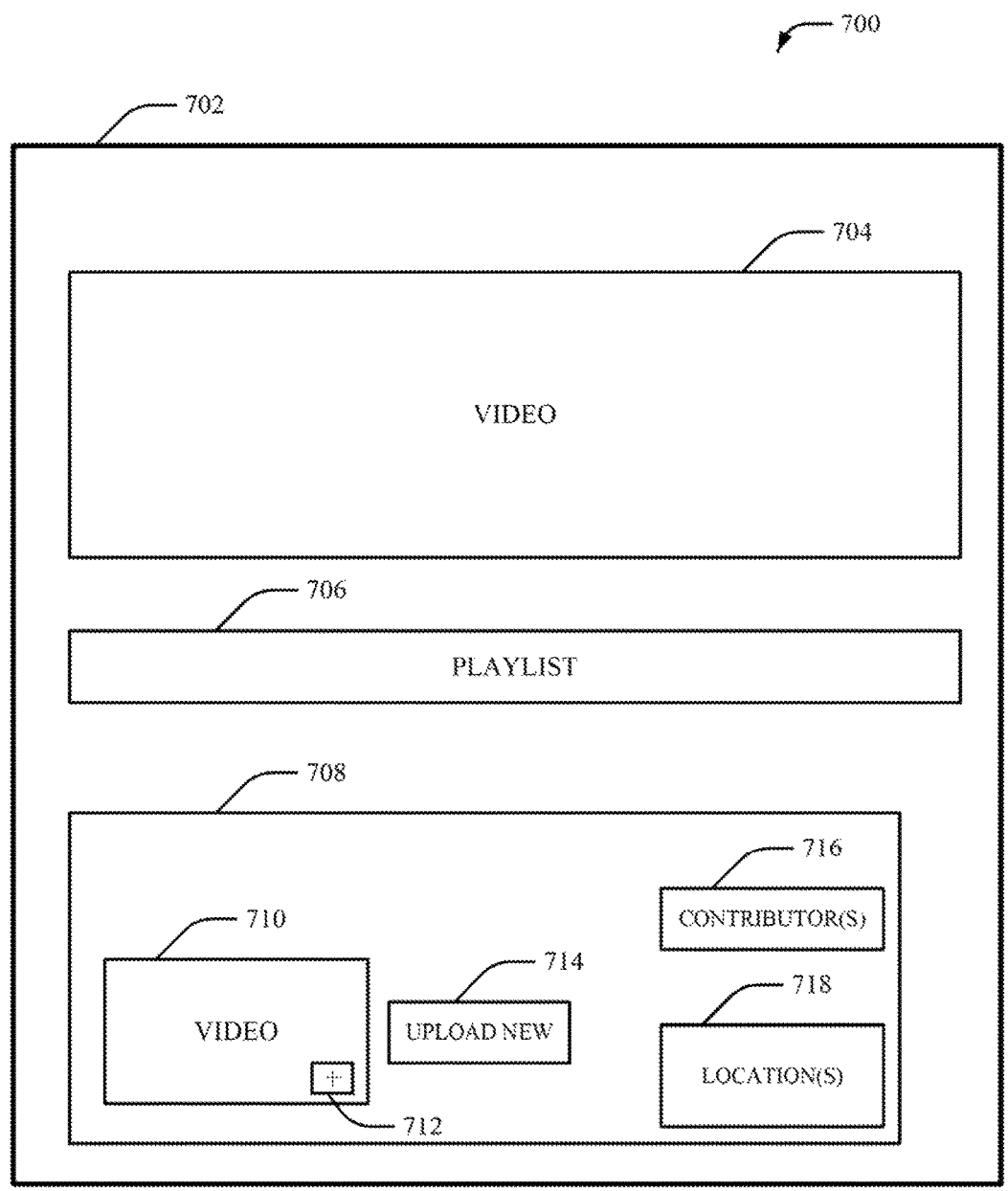
FIG. 7 illustrates an exemplary non-limiting display of a user interface for suggesting media content to contribute to a playlist, in accordance with various aspects and implementations described herein.

Referring now to FIG. 7, there is illustrated a non-limiting implementation of a system 700, in accordance with various aspects and implementations of this disclosure. The system 700 illustrates an example webpage 702 (e.g., a user interface for suggesting media content to contribute to a playlist). In one example, the webpage 702 can be a video hosting website. The webpage 702 can include a video 704, a playlist 706 and a watch page 708. The video 704 can be a video included in the playlist 706. The playlist 706 can include one or more thumbnails for the videos in the playlist 706. The video(s) in the playlist 706 can be added by one or more users of a content site or service. As such, the playlist 706 can be implemented as a collaborative playlist.

The watch page 708 can be a watch page associated with the video 704. For example, the watch page can include information related to the video 704, such as but not limited to, a title, a description, an upload date, number of views, name of the user that uploaded the video 704, etc. Additionally, the watch page 708 can include a video 710, a thumbnail button 712, an upload (e.g., upload new) button 714, a contributor information 716 and/or location information 718. The video 710 can be uploaded video content (e.g., uploaded media content) of the at least one invitee that is related to the video 704. For example, the video 710 can be a contextually suggested video that can be added to the playlist 706. The video 710 can be determined based on a comparison of metadata of the video 710 with metadata of the video 704, as more fully disclosed herein. The thumbnail button 712 can be implemented to display other uploaded video content of the at least one invitee that is related to the video 704. The upload button 714 can be implemented to add the video 710 to the playlist 706. For example, the upload button 714 can be configured to add the video 710 to the playlist 706 in response to the upload button 714 being activated by a user (e.g., a user can click the upload button to add the video 710 to the playlist 706). The contributor information 716 can include one or more users (e.g., a playlist owner and/or one or more invitees) that have contributed media content to the playlist 706. The location information 718 can include a geographic location (e.g., via a location on a map) associated with the video 704 and/or other media content of the playlist 706. It is to be appreciated that the video 710 (e.g., video suggestions) can be presented using a different user interface. For example, the video 710 (e.g., video suggestions) can be displayed on a video manager interface, on a playlist page, etc.

Figure 8:
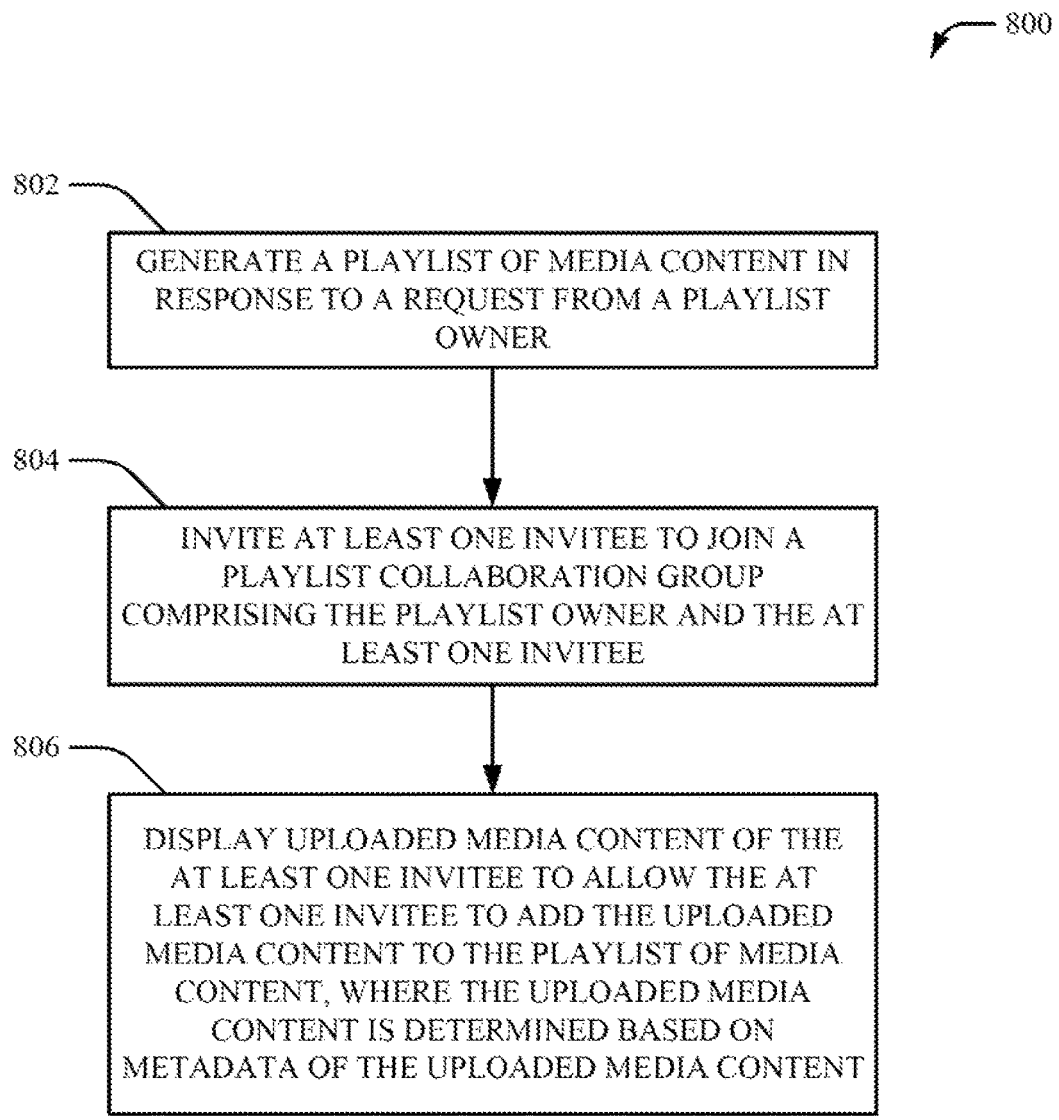
FIG. 8 depicts a flow diagram of an example method for suggesting media content to contribute to a playlist, in accordance with various aspects and implementations described herein.
Figure 9:
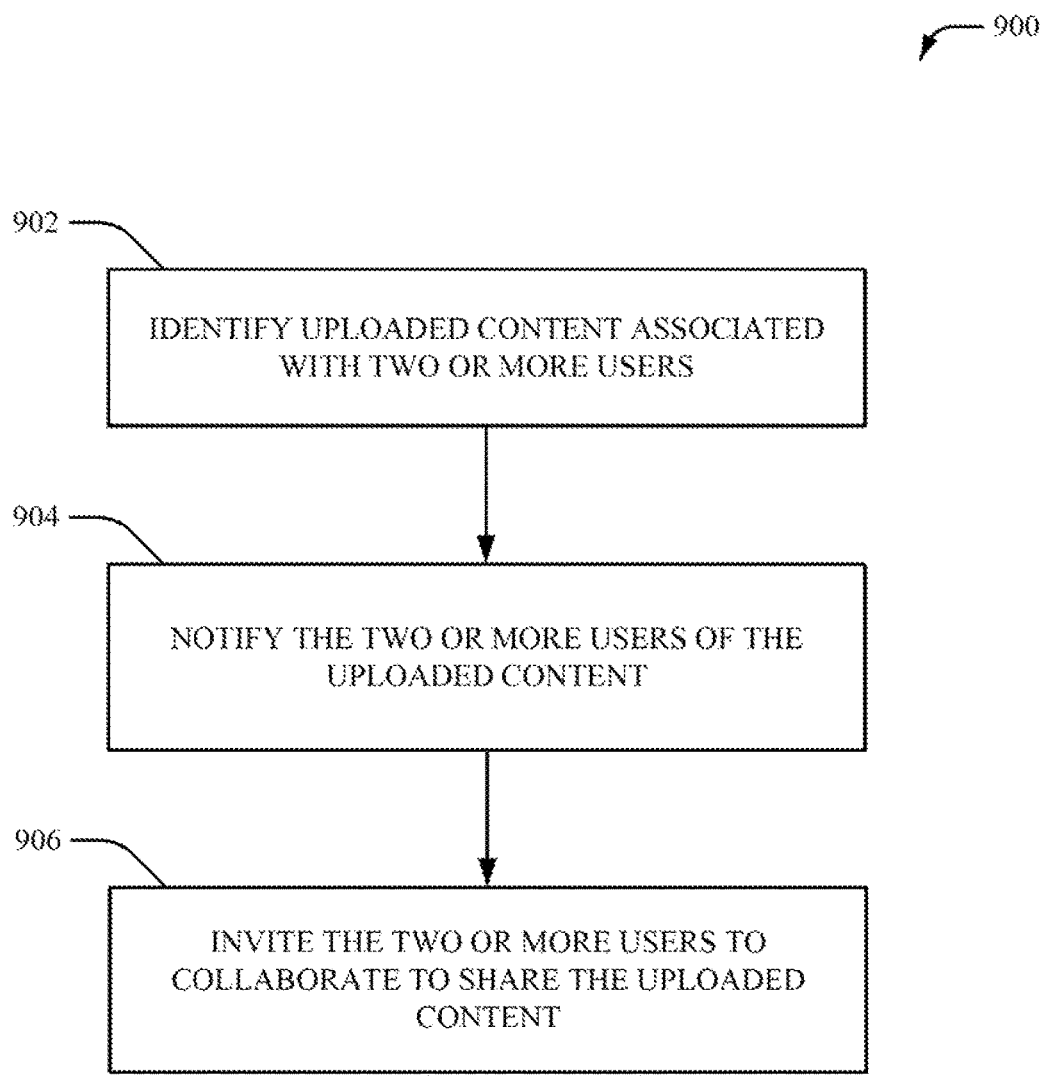
FIG. 9 depicts a flow diagram of an example method for sharing media content in a collaborative playlist, in accordance with various aspects and implementations described herein.
Figure 10:
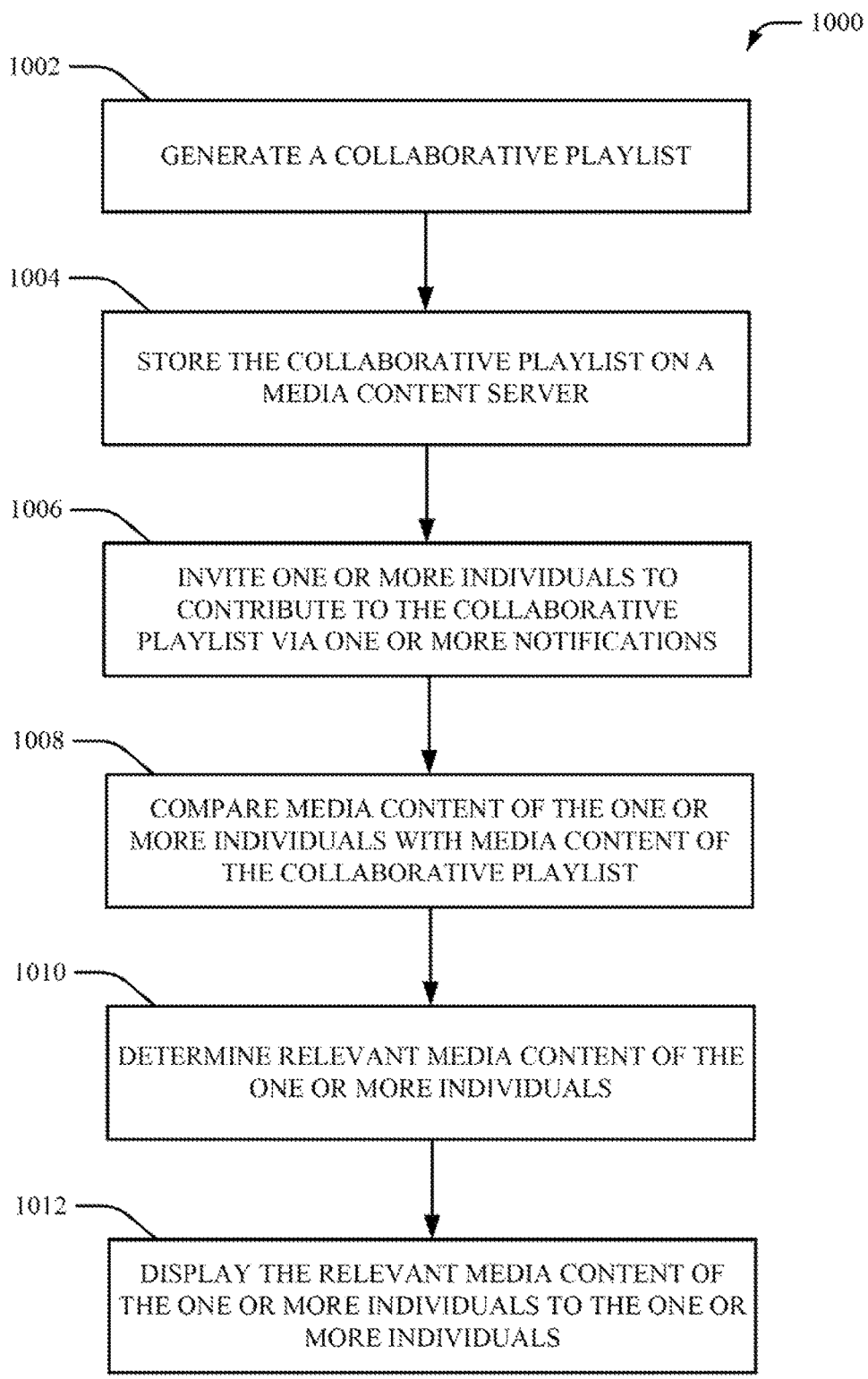
FIG. 10 depicts a flow diagram of another example method for suggesting media content to contribute to a playlist, in accordance with various aspects and implementations described herein.

FIGS. 8-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 8, there illustrated is a methodology 800 for suggesting media content to contribute to a playlist, according to an aspect of the subject innovation. As an example, methodology 800 can be utilized in various applications, such as, but not limited to, media server systems, media content server systems, network systems, computer network systems, communication systems, router systems, server systems, high availability server systems (e.g., Telecom server systems), Web server systems, file server systems, disk array systems, powered insertion board systems, cloud-based systems, etc. Specifically, the methodology 800 can contextually suggest media content to add to a playlist based on relevancy to content in the playlist.

At 802, a playlist of media content is generated (e.g., by playlist component 104) in response to a request from a playlist owner. For example, a playlist with one or more videos can be generated in response to a request from a playlist owner. At 804, at least one invitee can be invited (e.g., by social component 106) to join a playlist collaboration group comprising the playlist owner and the at least one invitee. For example, at least one invitee can be invited to contribute one or more videos to the playlist. At 806, uploaded media content of the at least one invitee can be displayed (e.g., by a suggestion component 108) to allow the at least one invitee to add the uploaded media content to the playlist of media content. The uploaded media content can be determined based on metadata of the uploaded media content. For example, one or more uploaded videos of the at least one invitee associated with the one or more videos in the playlist can be displayed (e.g., via a watch page on a video hosting website). The one or more uploaded videos of the at least one invitee can be associated with the one or more videos of the playlist based at least in part on metadata of the one or more uploaded videos and/or the one or more videos.

Referring to FIG. 9, there illustrated is an example methodology 900 for sharing media content in a collaborative playlist. At 902, uploaded content associated with two or more users can be identified (e.g., using an identification component 604). For example, uploaded content (e.g., videos) associated with two or more users can be identified based on metadata of the uploaded content. At 904, the two or more users of the uploaded content can be notified (e.g., using a notification component 606). For example, a first user can be notified that an uploaded video of the first user is related to an uploaded video of a second user. At 906, the two or more users can be invited (e.g., using a notification component 606) to collaborate to share the uploaded content. For example, the first user and the second user can be invited to share the uploaded videos (e.g., the related uploaded videos) by adding the uploaded videos of the first user and the second user to a collaborative playlist.

Referring to FIG. 10, there illustrated is an example methodology 1000 for suggesting media content for a collaborative playlist. At 1002, a collaborative playlist can be generated (e.g., by a playlist component 104). For example, the collaborative playlist can be generated in response to a request from a playlist owner. At 1004, the collaborative playlist can be stored (e.g., using the playlist component 104) on a media content server. For example, the collaborative playlist can be stored in connection with a media content site or service. At 1006, one or more individuals can be invited (e.g., by a social component 106) to contribute to the collaborative playlist via one or more notifications. For example, one or more individuals can be invited by the playlist owner to add media content to the collaborative playlist. At 1008, media content of the one or more individuals can be compared (e.g., using a suggestion component 108) with media content of the collaborative playlist. For example, metadata of the media content of the one or more individuals can be compared with metadata of media content in the collaborative playlist. At 1010, relevant media content of the one or more individuals can be determined (e.g., by a suggestion component 108). For example, metadata of the media content of the one or more individuals can be used to determine relevancy to the media content of the collaborative playlist. At 1012, the relevant media content of the one or more individuals can be displayed (e.g., using a suggestion component 108) to the one or more individuals. For example, the relevant media content of the one or more individuals can be displayed along with the media content of the collaborative playlist (e.g., via a watch page on a video hosting website). As such, the relevant media content of the one or more individuals can be added to the collaborative playlist.

Figure 11:
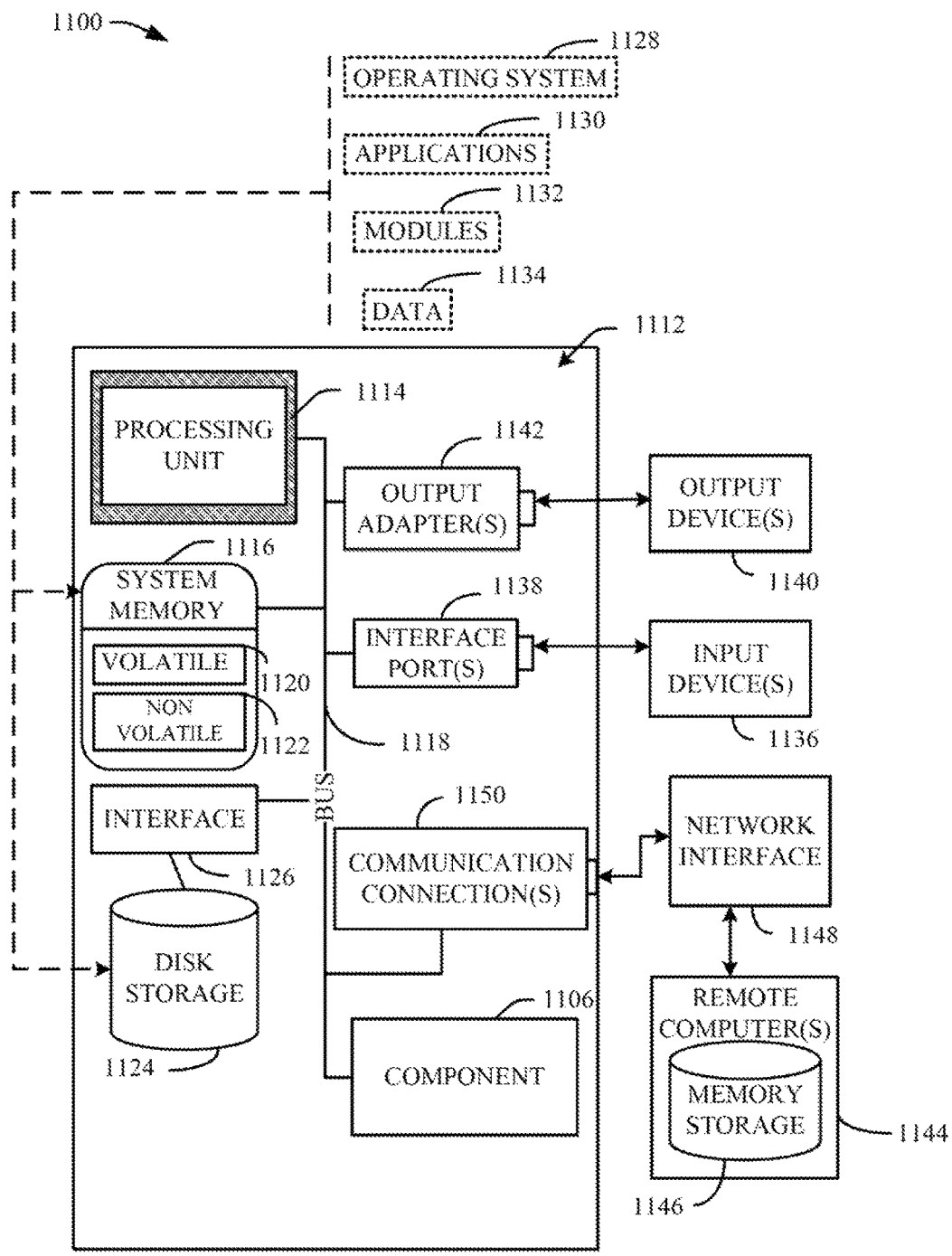
FIG. 11 is a schematic diagram illustrating a suitable operating environment.
Figure 12:
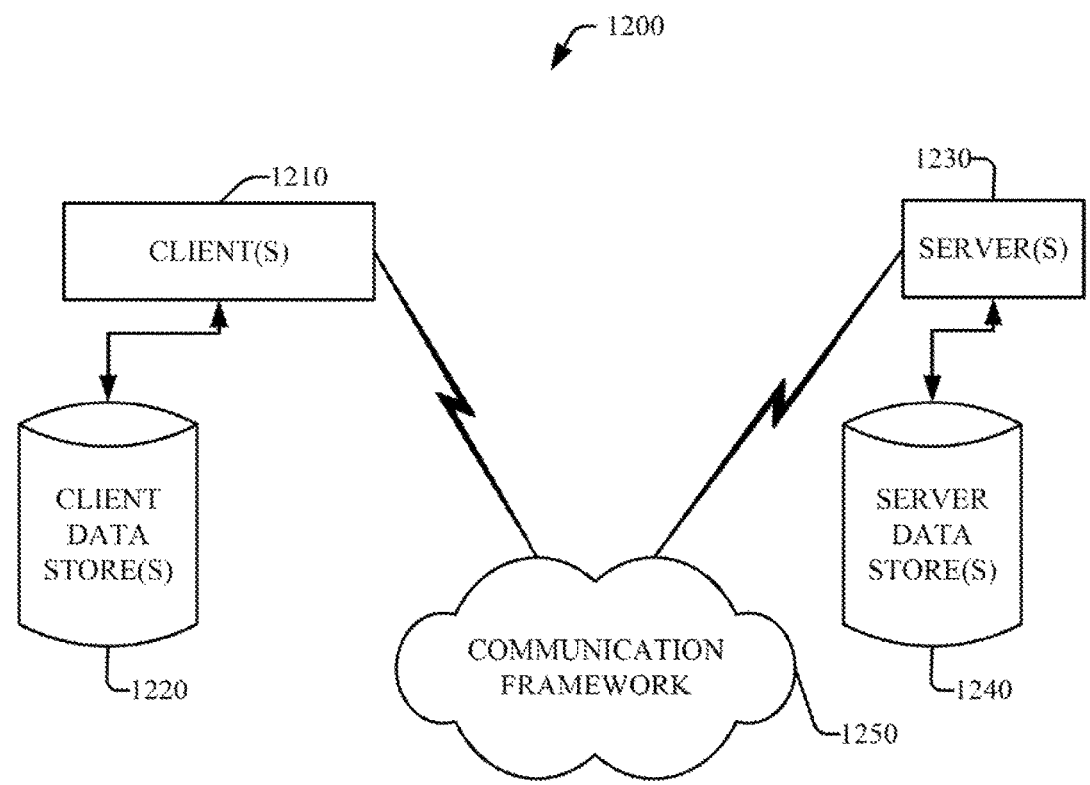
FIG. 12 is a schematic diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118.

The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

It is to be appreciated that the computer 1112 can be used in connection with implementing one or more of the systems or components shown and described in connection with FIGS. 1-6. In accordance with various aspects and implementations, the computer 1112 can be used to suggest media content contributions for a collaborative playlist. In certain exemplary embodiments, the computer 1112 includes a component 1106 (e.g., the collaboration component 102) that can contain, for example, a playlist component, a social component, a suggestion component, a location component, an update component, an identification component and/or a notification component, each of which can respectively function as more fully disclosed herein.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD)), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., collaboration component, playlist component, social component, suggestion component, location component, update component, identification component, notification component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method for modifying playlists, the method comprising:
    determining, using a hardware processor, whether to provide a user with access to a collaborative list of first media content items, wherein the user is associated with second media content items;
    in response to determining that the user is to be provided with access to the collaborative list of first media content items, causing, using the hardware processor, the collaborative list that includes at least a portion of the first media content items to be presented in a user interface;
    determining, using the hardware processor, whether the user has interacted with a media content item from the collaborative list of first media content items being presented in the user interface;
    in response to determining that the user has interacted with the media content item from the collaborative list of first media content items being presented in the user interface, selecting at least one related media content item from the second media content items based on the interacted media content item; and
    presenting the at least one related media content item to be presented in the user interface while concurrently presenting an option to insert the at least one related media content item into the collaborative list.

2. The method of claim 1, further comprising comparing metadata corresponding to the second media content items with metadata corresponding to the first media content items, wherein the at least one related media content item is selected from the second media content items based on the comparison.

3. The method of claim 1, further comprising generating the collaborative list of first media content items in response to receiving a request from a list owner, wherein the first media content items in the collaborative list are selected from media content items uploaded to a media server by the list owner.

4. The method of claim 1, further comprising transmitting an invitation to the user to join a collaboration group including at least the list owner and the user.

5. The method of claim 1, wherein causing the collaborative list to be presented in the user interface further comprises causing at least a portion of the collaborative list to be presented in a watch page.

6. The method of claim 1, wherein determining whether the user has selected the media content item from the collaborative list of first media content items for presentation in the user interface further comprises determining that one or more inputs has been received from the user to play back one of the first media content items in the user interface.

7. The method of claim 1, further comprises inserting the at least one related media content item into the collaborative list in response to receiving a user selection of the option.

8. A system for modifying playlists, the system comprising:
a hardware processor that is configured to:
determine whether to provide a user with access to a collaborative list of first media content items, wherein the user is associated with second media content items;
in response to determining that the user is to be provided with access to the collaborative list of first media content items, cause the collaborative list that includes at least a portion of the first media content items to be presented in a user interface;
determine whether the user has interacted with a media content item from the collaborative list of first media content items being presented in the user interface;
in response to determining that the user has interacted with the media content item from the collaborative list of first media content items being presented in the user interface, select at least one related media content item from the second media content items based on the interacted media content item; and
present the at least one related media content item to be presented in the user interface while concurrently presenting an option to insert the at least one related media content item into the collaborative list.

9. The system of claim 8, wherein the hardware processor is further configured to compare metadata corresponding to the second media content items with metadata corresponding to the first media content items, wherein the at least one related media content item is selected from the second media content items based on the comparison.

10. The system of claim 8, wherein the hardware processor is further configured to generate the collaborative list of first media content items in response to receiving a request from a list owner, wherein the first media content items in the collaborative list are selected from media content items uploaded to a media server by the list owner.

11. The system of claim 8, wherein the hardware processor is further configured to transmit an invitation to the user to join a collaboration group including at least the list owner and the user.

12. The system of claim 8, wherein causing the collaborative list to be presented in the user interface further comprises causing at least a portion of the collaborative list to be presented in a watch page.

13. The system of claim 8, wherein determining whether the user has selected the media content item from the collaborative list of first media content items for presentation in the user interface further comprises determining that one or more inputs has been received from the user to play back one of the first media content items in the user interface.

14. The system of claim 8, wherein the hardware processor is further configured to insert the at least one related media content item into the collaborative list in response to receiving a user selection of the option.

15. A non-transitory computer-readable medium containing computer-executable instructions that, when executed by a processor, cause the processor to perform a method for providing personalized notifications to video viewers, the method comprising:
determining whether to provide a user with access to a collaborative list of first media content items, wherein the user is associated with second media content items;
in response to determining that the user is to be provided with access to the collaborative list of first media content items, causing the collaborative list that includes at least a portion of the first media content items to be presented in a user interface;
determining whether the user has interacted with a media content item from the collaborative list of first media content items being presented in the user interface;
in response to determining that the user has interacted with the media content item from the collaborative list of first media content items being presented in the user interface, selecting at least one related media content item from the second media content items based on the interacted media content item; and
presenting the at least one related media content item to be presented in the user interface while concurrently presenting an option to insert the at least one related media content item into the collaborative list.

16. The non-transitory computer-readable medium of claim 15, wherein the method further comprises comparing metadata corresponding to the second media content items with metadata corresponding to the first media content items, wherein the at least one related media content item is selected from the second media content items based on the comparison.

17. The non-transitory computer-readable medium of claim 15, wherein the method further comprises generating the collaborative list of first media content items in response to receiving a request from a list owner, wherein the first media content items in the collaborative list are selected from media content items uploaded to a media server by the list owner.

18. The non-transitory computer-readable medium of claim 15, wherein the method further comprises transmitting an invitation to the user to join a collaboration group including at least the list owner and the user.

19. The non-transitory computer-readable medium of claim 15, wherein causing the collaborative list to be presented in the user interface further comprises causing at least a portion of the collaborative list to be presented in a watch page.

20. The non-transitory computer-readable medium of claim 15, wherein determining whether the user has selected the media content item from the collaborative list of first media content items for presentation in the user interface further comprises determining that one or more inputs has been received from the user to play back one of the first media content items in the user interface.

21. The non-transitory computer-readable medium of claim 15, wherein the method further comprises inserting the at least one related media content item into the collaborative list in response to receiving a user selection of the option.

* * * * *